United States Patent
Campbell et al.

(10) Patent No.: US 10,740,248 B2
(45) Date of Patent: Aug. 11, 2020

(54) METHODS AND SYSTEMS FOR PREDICTING VIRTUAL ADDRESS

(71) Applicant: International Business Machines Corporation, Armonk, NY (US)

(72) Inventors: David Campbell, Austin, TX (US); Dwain A. Hicks, Pflugerville, TX (US); Christian Jacobi, West Park, NY (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 16/218,903

(22) Filed: Dec. 13, 2018

(65) Prior Publication Data

US 2020/0192817 A1 Jun. 18, 2020

(51) Int. Cl.
| | |
|---|---|
| *G06F 12/10* | (2016.01) |
| *G06F 12/1036* | (2016.01) |
| *G06F 12/1018* | (2016.01) |
| *G06F 12/0862* | (2016.01) |
| *G06F 9/38* | (2018.01) |
| *G06F 12/123* | (2016.01) |

(52) U.S. Cl.
CPC ........ *G06F 12/1036* (2013.01); *G06F 9/3806* (2013.01); *G06F 12/0862* (2013.01); *G06F 12/1018* (2013.01); *G06F 12/123* (2013.01); *G06F 2212/652* (2013.01); *G06F 2212/654* (2013.01)

(58) Field of Classification Search
CPC ............. G06F 12/1036; G06F 12/0862; G06F 12/1018; G06F 12/123; G06F 9/3806
See application file for complete search history.

(56) References Cited

U.S. PATENT DOCUMENTS

| | | | | |
|---|---|---|---|---|
| 5,210,838 A | * | 5/1993 | Jensen ................ | G06F 9/30043 711/213 |
| 5,418,922 A | * | 5/1995 | Liu ..................... | G06F 12/0864 711/128 |
| 5,530,822 A | * | 6/1996 | Beavers .............. | G06F 12/1036 365/49.17 |
| 5,860,151 A | * | 1/1999 | Austin ................. | G06F 9/355 711/213 |

(Continued)

OTHER PUBLICATIONS

Thomas Barr et al, SpecTLB: A Mechanism for Speculative Address Translation, Jun. 2011, ISCA (Year: 2011).*

(Continued)

*Primary Examiner* — Ryan Bertram
(74) *Attorney, Agent, or Firm* — Scully, Scott, Murphy & Presser, P.C.

(57) ABSTRACT

A method or system of translating a virtualized address to a real address is disclosed that includes receiving a virtualized address for translation; generating a predicted intermediate address translation using a portion of the bit field of the virtualized address; determining a predicted real address using the predicted intermediate address or portion thereof; performing a translation of the virtualized address to an actual intermediate address; determining whether the predicted intermediate address is the same as the actual intermediate address; and in response to the predicted intermediate address being the same as the actual intermediate address, providing the predicted real address as the real address.

20 Claims, 9 Drawing Sheets

(56) References Cited

U.S. PATENT DOCUMENTS

| | | | | |
|---|---|---|---|---|
| 5,893,930 A * | 4/1999 | Song | ............... | G06F 12/1027 |
| | | | | 711/205 |
| 6,353,879 B1 * | 3/2002 | Middleton | ............ | G06F 12/10 |
| | | | | 711/202 |
| 9,552,304 B2 | 1/2017 | Kauer et al. | | |
| 9,886,393 B2 | 2/2018 | Meredith et al. | | |
| 2003/0131212 A1 * | 7/2003 | Liptay | ............ | G06F 12/0862 |
| | | | | 711/203 |
| 2004/0083349 A1 * | 4/2004 | Luick | ............ | G06F 9/30167 |
| | | | | 711/216 |
| 2006/0161758 A1 * | 7/2006 | Bradford | ............ | G06F 12/1036 |
| | | | | 711/202 |
| 2006/0179266 A1 * | 8/2006 | Flood | ............ | G06F 9/30043 |
| | | | | 711/220 |
| 2008/0276066 A1 * | 11/2008 | Lee | ............ | G06F 12/1027 |
| | | | | 711/204 |
| 2010/0228944 A1 * | 9/2010 | Bassett | ............ | G06F 12/1027 |
| | | | | 711/207 |
| 2014/0013074 A1 | 1/2014 | Koka et al. | | |
| 2017/0344492 A1 * | 11/2017 | Bolbenes | ............ | G06F 12/1027 |
| 2018/0039577 A1 * | 2/2018 | Chadha | ............ | G06F 12/0804 |
| 2018/0246723 A1 * | 8/2018 | Prasky | ............ | G06F 9/30098 |

OTHER PUBLICATIONS

Papadopoulou, M.M., Address Translation Optimizations for Chip Multiprocessors, 2017.

* cited by examiner

METHODS AND SYSTEMS FOR PREDICTING VIRTUAL ADDRESS

BACKGROUND

The disclosure herein relates generally to data processing, and more particularly, to methods, apparatus, and systems for optimizing address translations in a computer system.

Among other tasks, memory management manages the data stored in a computer including overseeing the retrieval and storage of data from memory in a computer. Memory management is often a key factor in overall system performance for a computer. Computer systems often include physical memory used to store applications and data. Modern computers typically rely on a memory management technique known as virtual memory management to increase performance and provide greater flexibility in computers and the underlying architectural designs upon which they are premised.

With a virtual memory system, the underlying hardware implementing the memory system of a computer is effectively hidden from the software of the computer. A relatively large virtual memory space, e.g., 64-bits or more in width, is typically used for such a computer, with computer programs that execute on the computer accessing the memory system using addresses pointing to locations in the virtual memory space. The physical memory devices in the computer, however, are accessed via "real" addresses that map directly into specific memory locations in the physical memory devices. Hardware and/or software in the computer are provided to perform "address translation" to map the real memory addresses of the physical memory to virtualized addresses in the virtual memory space. As such, whenever a computer program on a computer attempts to access memory using a virtualized address, the computer translates the virtualized address into a corresponding real address so that the access can be made to the appropriate location in the appropriate physical device mapped to the virtualized address.

One feature of virtual addressing is that it not necessary for a computer to include storage for the entire virtual memory space in the physical memory devices in the computer's main memory. Instead, lower levels of storage, such as disk drives and other mass storage devices may be used as supplemental storage, with memory addresses grouped into "pages" that are swapped between the main memory and supplemental storage as needed ("paging"). When the processing system uses paging, the low order bits of the virtual address are preserved and used directly as the low order bits of the actual physical address, while the high order bits may be treated as a key or index to one or more address translation tables that correspond to a range of consecutive physical addresses. The memory referenced by such a range may be called a page. Page sizes may range in size, for example, from 512 bytes through 8 megabytes.

In addition, some computer designs also include the concept of segmentation, which partitions the virtual memory into different segments in order to facilitate and simplify the handling of large and growing data structures, and otherwise provide greater flexibility for performing memory management when multiple processes are capable of being handled in a computer at any given time. Each segment typically is mapped to blocks of pages. When segmentation is used, an additional layer of virtualization is used, requiring an additional translation to be performed. Typically, in systems incorporating segmentation and paging, computer programs access the memory system using "effective" addresses, thus requiring a translation first from effective (EA) address to intermediate or virtual address (VA), and then from intermediate or virtual address (VA) to real address (RA).

Address translation in a virtual memory system typically incorporates accessing various address translation data structures. One such structure, referred to as a segment table, includes multiple entries that map effective addresses to intermediate virtual addresses on a segment-by segment basis. Another such structure, referred to as a page table, includes multiple entries that map intermediate virtual addresses to real addresses on a page-by-page basis. Using virtual addressing, processors can access memory using physical addresses that are generated from translating effective addresses (EA) to intermediate or virtual addresses (VA) and translating intermediate or virtual addresses (VA) to physical or real addresses (RA).

Often, due to the large number of memory accesses that constantly occur in a computer, the number of entries required to map all of the memory address space in use by a computer can be significant, and requires the entries to be stored in main storage, rather than in dedicated memory, which makes accessing such entries slow. To accelerate address translation, high speed memories referred to as segment look-aside buffers (SLB) and translation look-aside buffers (TLB) are typically used to cache recently-used entries for quick access by the computer. A SLB is a cache of segment table entries mapping effective addresses (EA) to intermediate or virtual addresses (VA). A TLB is a cache of page table entries mapping intermediate or virtual addresses (VA) to physical addresses or real addresses (RA). With each memory access, the EA is presented to the SLB, which if the SLB hits the SLB provides the VA, and then the VA is presented to the TLB which if the TLB hits the TLB provides a real address (RA) to the processor. If the address misses in the SLB or TLB, a more costly hardware handler or software handler is invoked to load and insert the required segment table entry into the SLB, and/or the page table entry into the TLB so the address will hit in the SLB and TLB and the memory access can proceed.

Due to the frequency of memory access requests in a computer, address translation can have a significant impact on overall system performance. As such, it is desirable to minimize the amount of time to provide an address translation.

SUMMARY

The summary of the disclosure is given to aid understanding of a computer system, computer architectural structure, processor, and method of translating addresses in a computer system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

A method of translating a virtualized address to a real address is disclosed that in one or more embodiments includes, by a processing system, receiving a virtualized address for translation, generating a predicted intermediate address translation using a portion of the bit field of the virtualized address, determining a predicted real address using the predicted intermediate address or portion thereof; performing a translation of the virtualized address to an actual intermediate address (or portion thereof), determining whether the predicted intermediate address is the same as the actual intermediate address; and in response to determining that the predicted intermediate address is the same as the actual intermediate address, providing the predicted real address as the real address. The method in an embodiment further includes in response to determining that the predicted intermediate address is not the same as the actual intermediate address, determining the real address using the actual intermediate address (or portion thereof). The method in one or more embodiments optionally includes performing a hash of the predicted intermediate address or portion thereof and performing a translation of the virtualized address using the hash of the predicted intermediate address or portion thereof, performing a hash of the actual intermediate address or portion thereof, and determining whether the hash of the predicted intermediate address or portion thereof is the same as the hash of the actual intermediate address or portion thereof.

In another embodiment, a computing system is disclosed that includes a predictor table cache having a plurality of entries for translating a virtualized address to a predicted intermediate address or portion thereof, where each entry maps a portion of a bit field of the virtualized address to the predicted intermediate address or portion thereof; an intermediate address table cache having a plurality of intermediate address entries, where each intermediate address entry maps the virtualized address or portion thereof to an actual intermediate address or portion thereof; a real address table cache having a plurality of real address entries, wherein each real address entry maps an intermediate address or portion thereof to a real address; and a processor. The system in one or more embodiments is configured to receive a virtualized address for translation, predict from a portion of the bit field of the virtualized address the predicted intermediate address or portion thereof using the predictor table cache, determine the predicted real address using the predicted intermediate address or portion thereof from the predictor table cache in the real address table cache, determine the actual intermediate address or portion thereof using the intermediate address table cache, determine whether the predicted intermediate address or portion thereof is the same as the actual intermediate address or portion thereof; and in response to the predicted intermediate address or portion thereof being the same as the actual intermediate address or portion thereof, provide the predicted real address as a real address.

The system in an embodiment is preferably further configured to look up the actual intermediate address or portion thereof from a segment look-aside buffer (SLB) and look up the predicted real address or portion thereof from a translation look-aside buffer (TLB). The system in one or more embodiments is further configured to determine, in response to the predicted intermediate address or portion thereof not being the same as the actual intermediate address or portion thereof, the real address using the actual intermediate address or portion thereof in the real address table cache. In an aspect, the system is further configured to perform a hash of the predicted intermediate address or portion thereof, perform a translation of the virtualized address using the hash of the predicted intermediate address or portion thereof, perform a hash of the actual intermediate address or portion thereof, and determine whether the hash of the predicted intermediate address or portion thereof is the same as the hash of the actual intermediate address or portion thereof.

In another embodiment, a computing system is disclosed that has a table cache of a plurality of entries, wherein each entry maps a portion of a bit field of a virtualized address to a predicted intermediate address, a processor; and a non-transitory computer-readable storage medium comprising program instructions. The programming instructions when executed by the processor cause the processor to receive a virtualized address for translation, generate a predicted intermediate address using a portion of the bit field of the virtualized address, determine a predicted real address using the predicted intermediate address, perform a translation of the virtualized address to an actual intermediate address, determine whether the predicted intermediate address is the same as the actual intermediate address, in response to the predicted intermediate address being the same as the actual intermediate address, provide the predicted real address as the real address, and in response to the predicted intermediate address not being the same as the actual intermediate address, determine the real address using the actual intermediate address.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of a computer system, computer architectural structure, processor, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, features, aspects, assemblies, subassemblies, systems, circuitry, embodiments, and/or devices shown, and the arrangements, structures, subassemblies, features, aspects, methods, processes, circuitry, embodiments, and devices shown may be used singularly or in combination with other arrangements, structures, assemblies, subassemblies, systems, features, aspects, circuitry, embodiments, methods, techniques, processes, and/or devices.

DETAILED DESCRIPTION

Figure 1:
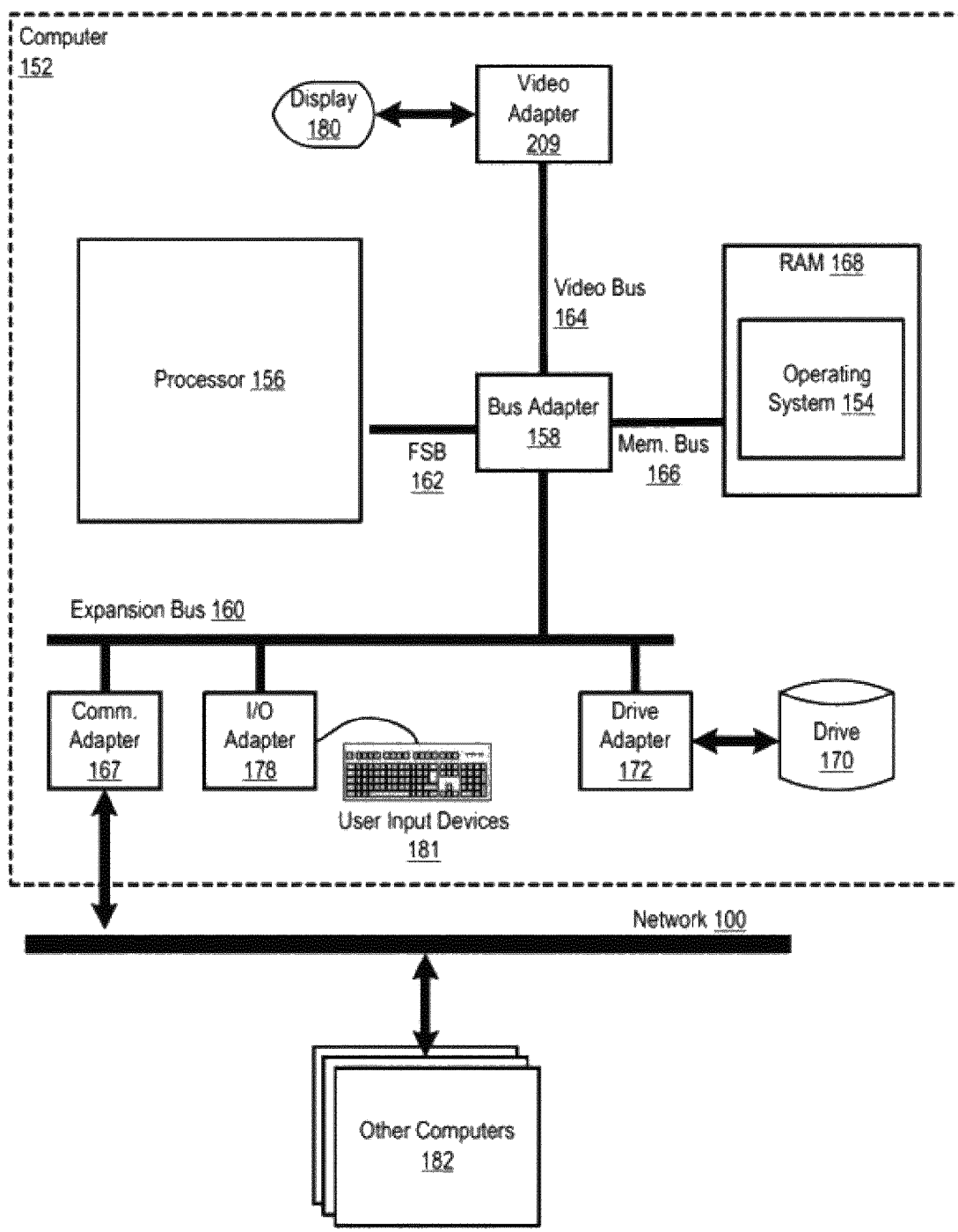
FIG. 1 is a functional block diagram illustrating a computer system, according to embodiments of the present disclosure.

The following description is made for illustrating the general principles of the invention and is not meant to limit the inventive concepts claimed herein. In the following detailed description, numerous details are set forth in order to provide an understanding of the computer system, computer architectural structure, processor, and their method of operation, however, it will be understood by those skilled in the art that different and numerous embodiments of the computer system, computer architectural structure, processor, and their method of operation may be practiced without those specific details, and the claims and disclosure should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes conventional features of information processing systems, including processors and microprocessor systems and architectures, as well as address translation techniques and systems, which are apparent to those skilled in the art. It is assumed that those skilled in the art are familiar with the general architecture of processors, and in particular with address translation techniques and systems, and their operation. It may be noted that a numbered element is numbered according to the figure in which the element is introduced, and is typically referred to by that number throughout succeeding figures.

In hash page table (HPT) address translation, an effective address (EA) is translated to an intermediate or virtual address (VA) through a structure referred to as a segment look-aside buffer (SLB). The intermediate or virtual address (VA) is then translated through a translation look-aside buffer (TLB) to generate a real address. Given the nature of the HPT translation algorithm, and since the TLB hash is generated using the intermediate or virtual address translation provided by the SLB, typically the real address is looked up after the SLB has been accessed and the intermediate or virtual address is generated. This design however introduces latency as the intermediate or virtual address needs to be computed before translating the intermediate or virtual address to a real address can be started. A more optimized design to limit, reduce, or eliminate the delay associated with such a two step translation process would be advantageous.

Disclosed are techniques and system to translate memory addresses from a computerized virtual environment to a real or physical computer memory environment. Disclosed are techniques and systems to translate memory addresses in a faster more efficient manner. In an embodiment, an address predictor is provided that predicts an intermediate or virtual address from an effective address, and in an aspect predicts the intermediate or virtual address from a portion of the effective address bits. In one or more embodiments, the predictor predicts the segment look-aside buffer (SLB) translation, e.g., the intermediate virtual address, and in an aspect predicts the segment from the SLB corresponding to the intermediate virtual address from a portion of the effective address bits. In one or more embodiments, the intermediate address predictor is a table mapping one or more intermediate or virtual addresses (or portions of the bit field of the intermediate or virtual address) to a portion of effective address bits. In an embodiment, a method, apparatus, and system are disclosed to predict an intermediate or virtual address from portions of the bit field of the effective address, and in an aspect higher order bits from the effective address bit field. Disclosed is a method and system of using the intermediate or virtual address predicted by the virtual/intermediate address predictor to generate real addresses in the physical computer memory to provide faster memory accesses.

Address translation typically occurs in a data or information handling environment, and more specifically commonly in a processor based system and/or a computerized environment. FIG. 1 is a functional block diagram illustrating a computer system 150 in which embodiments of the disclosure may be practiced. The system 150 includes an example of automated computing machinery in the form of a computer 152.

The computer 152 may include at least one processor 156 or central processing unit ("CPU") as well as random access memory 168 ("RAM"), which is connected via a high speed memory bus 166 and bus adapter 158 to the processor 156 and to other components of the computer 152.

Although the processor 156 is shown to be coupled to RAM 168 through the front side bus 162, the bus adapter 158, and the high speed memory bus 166, those of ordinary skill in the art will recognize that such configuration is only an exemplary implementation and other configurations of coupling the processor 156 to other components of the system 150 may be utilized. For example, in some embodiments the processor 156 may include a memory controller configured for direct coupling to the memory bus 166. Yet, in other embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™, Linux™, Microsoft Windows™, AIX™, IBM's z/OS™, and others known to those of ordinary skill in the art. In addition to the operating system 154 being located in RAM 168, other components of such as data processing applications may be stored in the RAM 168. Furthermore, software and other components may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially designed for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 174. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1.

Figure 2A:
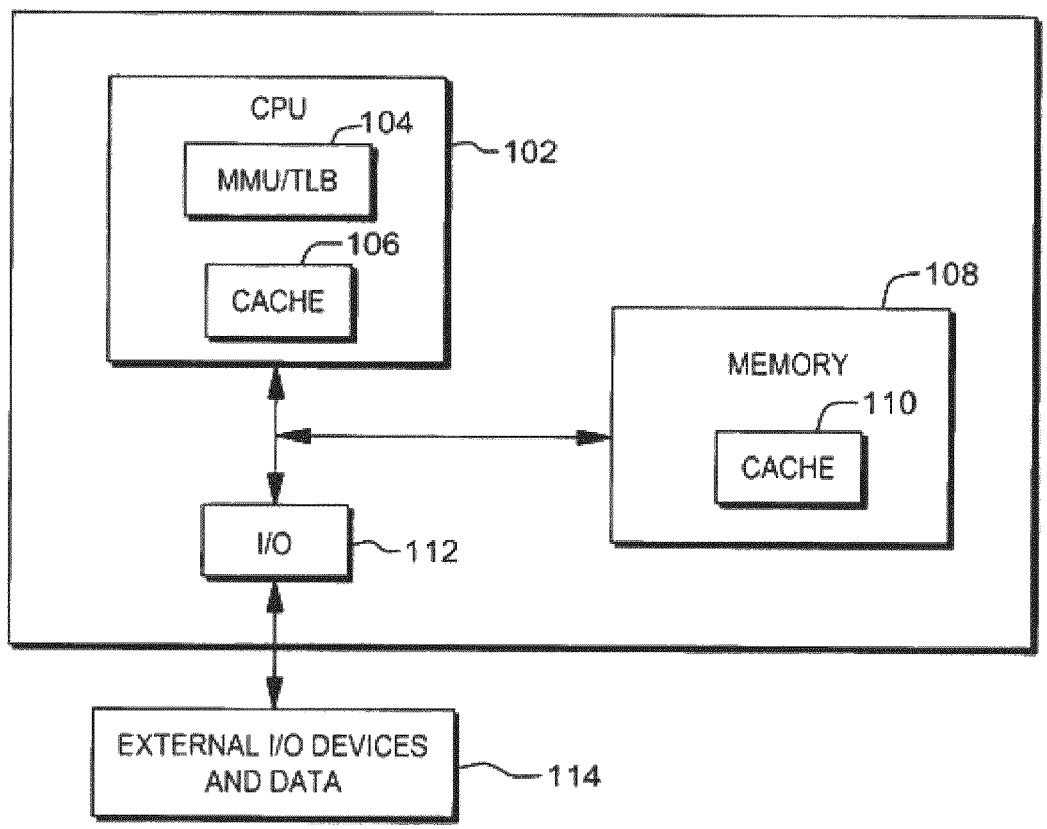
FIG. 2A depicts one example of a computing environment.

One example of a computing environment to incorporate and use one or more aspects of translation capability is described with reference to FIG. 2A. In one example, a computing environment 150 includes a processor (central processing unit—CPU) 102 that includes at least a cache 106 and at least one memory management unit (MMU) having a segment look-aside buffer (SLB) and a translation look-aside buffer (TLB), referred to as MMU/TLB portion 104. Processor 102 is communicatively coupled to a memory portion 108 having a cache 110, and to an input/output (I/O) portion 112. I/O portion 112 is communicatively coupled to external I/O devices 114 that may include, for example, data input devices, sensors and/or output devices, such as displays.

Memory management unit 104 is used in managing memory portion 108 including facilitating access to the memory by providing address translation. In an embodiment, to improve address translation, the memory management unit utilizes a segment look-aside buffer (SLB) and a translation look-aside buffer (TLB). Both the SLB and TLB are caches of previously translated addresses. Thus, when a request is received for a memory access that includes an address to be translated, typically the SLB and TLB are checked first, and more specifically, the SLB is checked first and then the TLB is checked. If the virtual address is cached in the SLB, then the virtual address is supplied to TLB, and if the virtual address is cached in the TLB, then the real address is provided to the processor. Otherwise, the received address is translated using one of any number of translation techniques.

Figure 2B:
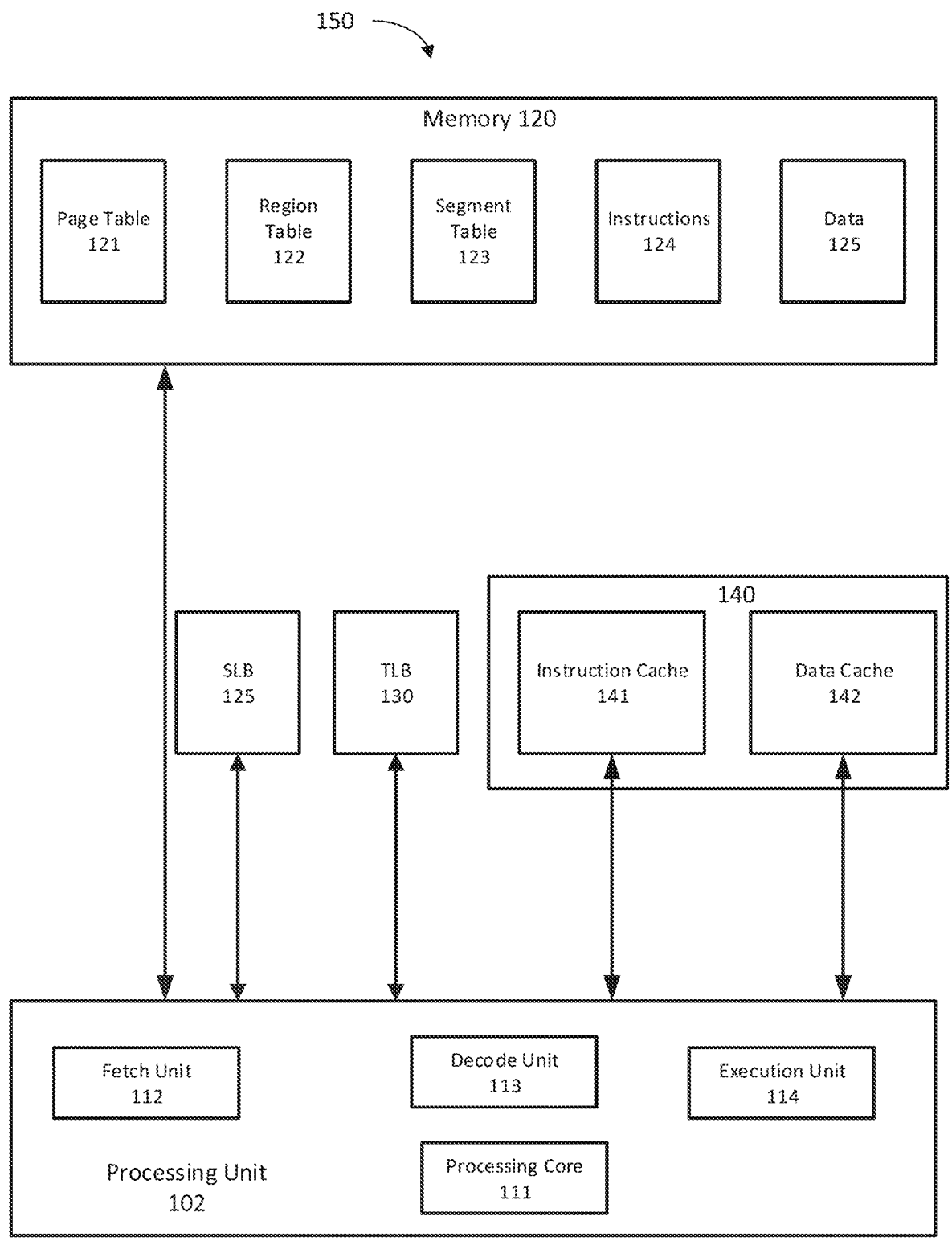
FIG. 2B depicts another example of a computing environment.

FIG. 2B illustrates a block diagram of a processing system 150 that represents one suitable environment within which address translation may be implemented. The processing system 150 includes a processing unit 102, memory 120, a segment look-aside buffer 125, a translation look-aside buffer 130, and cache memory 140. Cache memory 140 includes instruction cache 141 and the data cache 142, which store instructions and data, respectively, for quick access by the processing unit 102 during execution of instructions.

The processing unit 102 receives data, such as operand data, and instructions and executes the instructions. The processing unit 102 may include, for example, a processing core 111 including logic and other circuitry for processing data and instructions, a fetch unit 112 configured to fetch instructions, a decode unit 113 configured to decode instructions, and an execution unit 114 configured to execute the instructions. Although a few functional units of the processing unit 102 are illustrated for purposes of description, it is understood that the processing unit 102 may include additional functional units for retrieving, processing, and storing instructions and data.

The processing system 150 further includes memory 120 configured to store tables, such as a page table 121, region table 122, and segment table 123, as well as instructions 124 and data 125 which may be accessed and manipulated by the instructions 124. The page table 121, region table 122, and segment table 123 are collectively described as dynamic address translation (DAT) structures 121, 122, and 123. The memory 120 may include volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cassette or the like, etc.). Moreover, the memory 120 may incorporate electronic, magnetic, optical, and/or other types of storage media. In some embodiments, the memory 120 may have a distributed architecture, where various components are situated remote from one another, but can be accessed by the processor processing unit 102. In this disclosure, the terms physical memory, real memory, system memory and absolute memory are used interchangeably to refer to the main storage accessible to a processor.

Segment table 123 maps effective addresses (EAs) to intermediate addresses, also referred to as virtual addresses (VAs), on a segment-by-segment basis and has one or more segment table entries (STEs). Segment look-aside buffer (SLB) 125 stores mappings from effective memory addresses to intermediate or virtual memory addresses by caching one or more entries (STEs) from segment table 123.

The SLB 125 is a data structure used for caching some of the recently accessed segmented ID entries. The SLB entries are mappings between addresses in a segment table 123 of memory and addresses in a given page table 121. The SLB 125 may include effective addresses, virtual or intermediate addresses corresponding to the effective addresses, and additional information that categorizes or defines one or more of the effective addresses and the virtual/intermdiate addresses or provides information to a processing unit about the virtual/intermdiate address or the effective address. In one or more embodiments, the SLB 125 may have a context addressable memory (CAM) portion and a random accessible memory (RAM) portion.

Page 121 table maps intermediate or virtual addresses (VA) to real addresses (RA) on a page-by-page basis and includes one or more page table entries (PTEs). A TLB 130 stores mappings from virtual intermediate memory addresses to physical memory addresses by caching entries (PTEs) from a page table 121. A TLB 130 is a data structure used for caching some of the mappings between the addresses in a page table 121 of memory (e.g., virtual address space) and addresses in a given physical address space. The TLB may include virtual or intermediate addresses, real addresses corresponding to the virtual/intermediate addresses, and additional information that categorizes or defines one or more of the virtual/intermediate address and the real address or provides information to a processing unit about the real address or the virtual/intermediate address. In one or more embodiments, the TLB 130 may be a content addressable memory (CAM).

In operation, the fetch unit 112 fetches an instruction from memory 120 or from the instruction cache 141. The decode unit 113 reads the instruction and determines or identifies one or more virtualized addresses referenced by the instruction. The decode unit 113 may access the SLB 125 for effective-to-virtual (intermediate) address translation. If the address translation is not found in the SLB 125, the processing unit 102 may access the segment table 123 to obtain an effective-to-virtual (intermediate) address translation, or the processing unit 102 may build a new effective-to-virtual (intermediate) address translation. Once an effective-to-virtual (intermediate) address translation is built or accessed from the segment table 123, the effective-to-virtual address (intermediate) translation may be stored in the SLB 125 for quick access. For example, accessing memory 120 by the processing unit 102 may require more operations than accessing the SLB 125, and data transmission times may be slower between the memory 120 and the processing unit 102 than between the SLB 125 and the processing unit 102.

The decode unit 113 may access the TLB 130 for the virtual/intermdiate-to-real address translation. If the virtual/intermediate-to-real address translation is not found in the TLB 130, the processing unit 102 may access the page table 121 to obtain a virtual/intermediate-to-real address translation, or the processing unit 102 may build a new virtual/intermediate-to-real address translation. Once a virtual/intermediate-to-real address translation is built or accessed from the page table 121 the virtual/intermediate-to-real address translation may be stored in the TLB 130 for quick access. For example, accessing memory 120 by the processing unit 102 may require more operations than accessing the TLB 130, and data transmission times may be slower between the memory 120 and the processing unit 102 than between the TLB 130 and the processing unit 102.

During operation, the CPU references an effective address (EA) during processing of an instruction. Typically, the effective address is sent to the SLB 125 to provide a translation of the effective address to the virtual or intermediate address. When the EA is included as an entry in the SLB 125, then the virtual/intermediate address is sent to the TLB 130 to determine whether a corresponding entry exists in the TLB 130 indicating a real address, or a physical memory location, associated with the virtual/intermediate address. When the virtual or intermediate address is included as an entry in the TLB, the real address (RA) is provided to the CPU, along with any additional information in the entry, such as data access information, page size, and the system proceeds using the corresponding physical memory address received from the TLB.

Entries stored in the DAT structures 121, 122, and 123 and in the SLB 125 and TLB 130 may include effective addresses, virtual/intermediate addresses corresponding to the effective addresses, virtual or intermediate addresses, real addresses corresponding to the virtual/intermediate addresses, and additional information that categorizes or defines one or more of the effective addresses, virtual or intermediate addresses, and real addresses, or provides information to a processing unit about the effective address, the virtual/intermediate address, or the real address. For example, in some cases an entry may include a status indicator that may be changed to modify a designated status of a corresponding real address. An address storing data may change from a read/write status to a read-only status, or vice versa.

While FIG. 2B illustrates for purposes of description a processing system 150 including one processing unit 102, one SLB 125, one TLB 130, and one memory 120, embodiments of the present disclosure encompass any computing structure, including personal computers, servers, and mainframe computing structures including multiple CPUs.

Figure 3A:
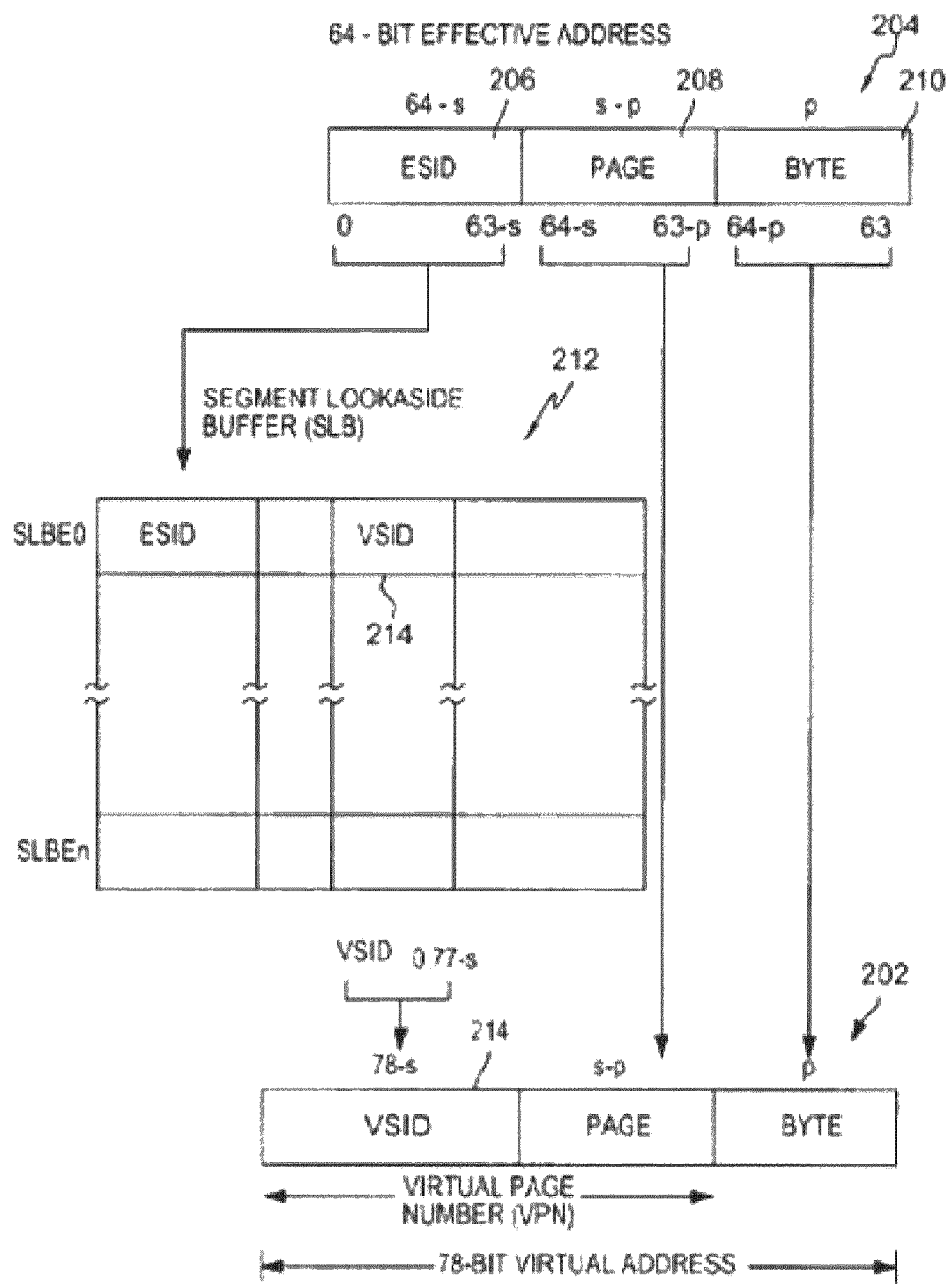
FIG. 3A illustrates an example of a technique for generating a virtual address.

FIG. 3A illustrates an example of a typical technique for generating a virtual or intermediate address 202 from an effective address 204. In this regard, an effective address 204 is received in, for instance, a memory management unit (MMU) of a processor. Effective address 204 includes an effective segment identifier (ESID) or Effective Page Number (EPN) field 206, a page field 208 and byte offset field 210. The ESID or EPN field is used to locate an entry in segment look-aside buffer (SLB) 212. In particular, the SLB is searched for an entry that matches the effective address 204. The matching entry in the SLB 212 includes an associated virtual segment identifier (VSID) or virtual page number (VPN) 214, and typically other information. The associated VSID 214 is used to generate intermediate or virtual address 202, which includes VSID 214, which is obtained from the SLB 212, and page 208 and byte 210 from the effective address 204. Virtual or intermediate address 202 is used to obtain a real address used to access physical memory in the memory system.

Figure 3B:
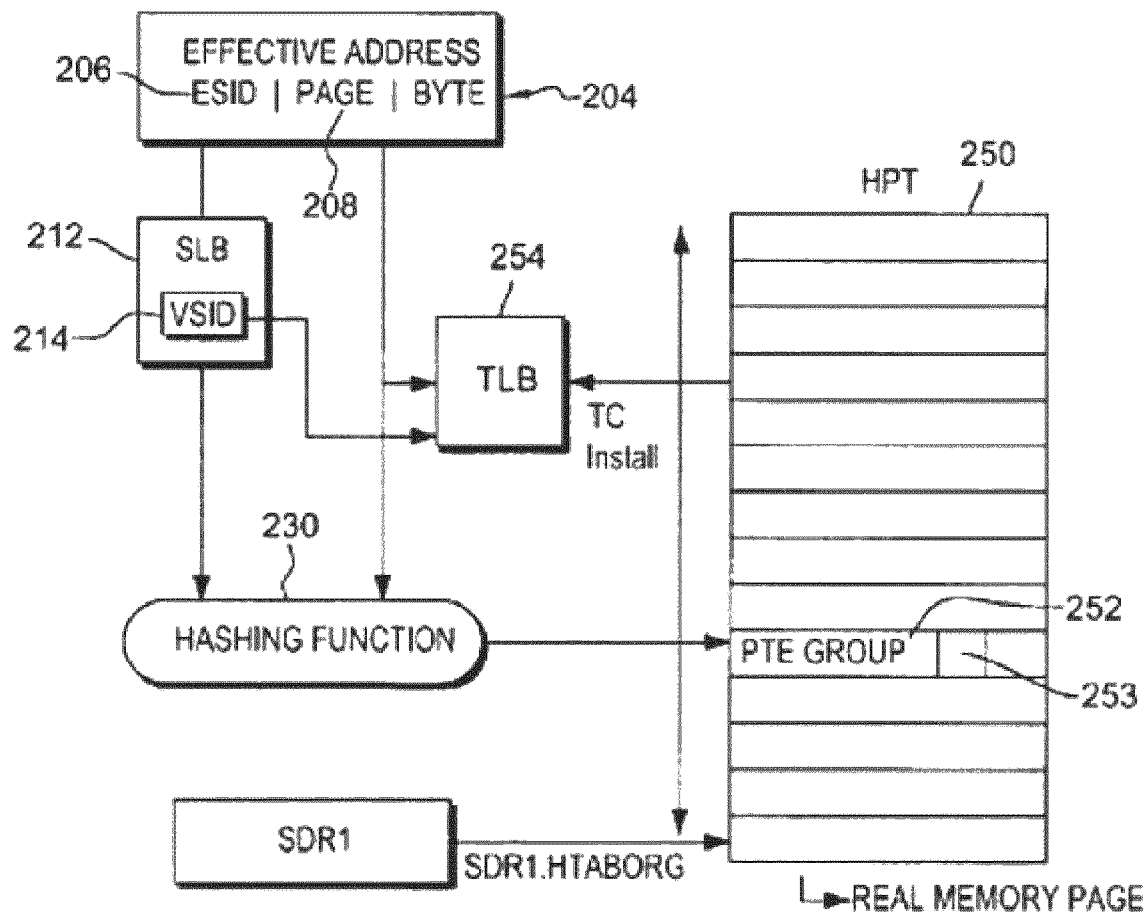
FIG. 3B depicts one example of a hash page table translation structure.

FIG. 3B illustrates an example of a hash page table (HPT) translation structure. ESID portion 206 of an effective address (EA) 204 is used to locate an entry in SLB 212 as described in connection with FIG. 3A. The entry in SLB 212 includes a VSID field 214. The value of VSID field 214 and a portion of EA 204 (page.byte) are hashed by a hashing generator 230 to produce a hash value that is used to locate a page table entry (PTE) group 252 in a hash page table (HPT) 250. Page table entries 253 of PTE group 252 are searched to locate a corresponding PTE. When a corresponding PTE is found, the address (e.g., real address) of the physical memory page in the PTE is used to access physical memory. In order to improve performance, once a PTE entry is found, the page portion 208 of EA 204 and the address of the physical memory page found in the PTE are stored in the TLB 254, such that further accesses to the same EA page will "hit" in the TLB 254 and avoid the PTE search. The page table is located by a page table origin address provided by the processor.

Further details regarding one implementation of page tables and page table entries are described in Power ISA™ Version 2.06 Revision B specification, Jul. 23, 2010, offered by International Business Machines Corporation and incorporated herein by reference in its entirety. Other address translation schemes, are contemplated by the disclosure. The TLB and/or SLB may be configured in any now or hereafter known format (e.g, an N-way set associative array, fully associative array, or the like). A variety of indexing schemes, known to those of ordinary skill in the art, may be used for TLB indexes. Other sizes and configurations for the SLB and/or TLB are within the scope of this disclosure. It will be appreciated that the architecture illustrated in FIG. 3B is merely illustrative in nature, and the disclosure and teachings may be utilized in a wide variety of other architectures utilizing address translation.

Disclosed is a method and system for predicting an intermediate address or virtual address (VA) from an effective address, including in an aspect predicting the intermediate or virtual address generated by a segment look-aside buffer (SLB). The predictor and technique provides a faster more efficient manner of providing a translation of effective addresses to virtual or intermediate addresses, and a method and system for using such predictor and address translation techniques in an address translation system.

Figure 4:
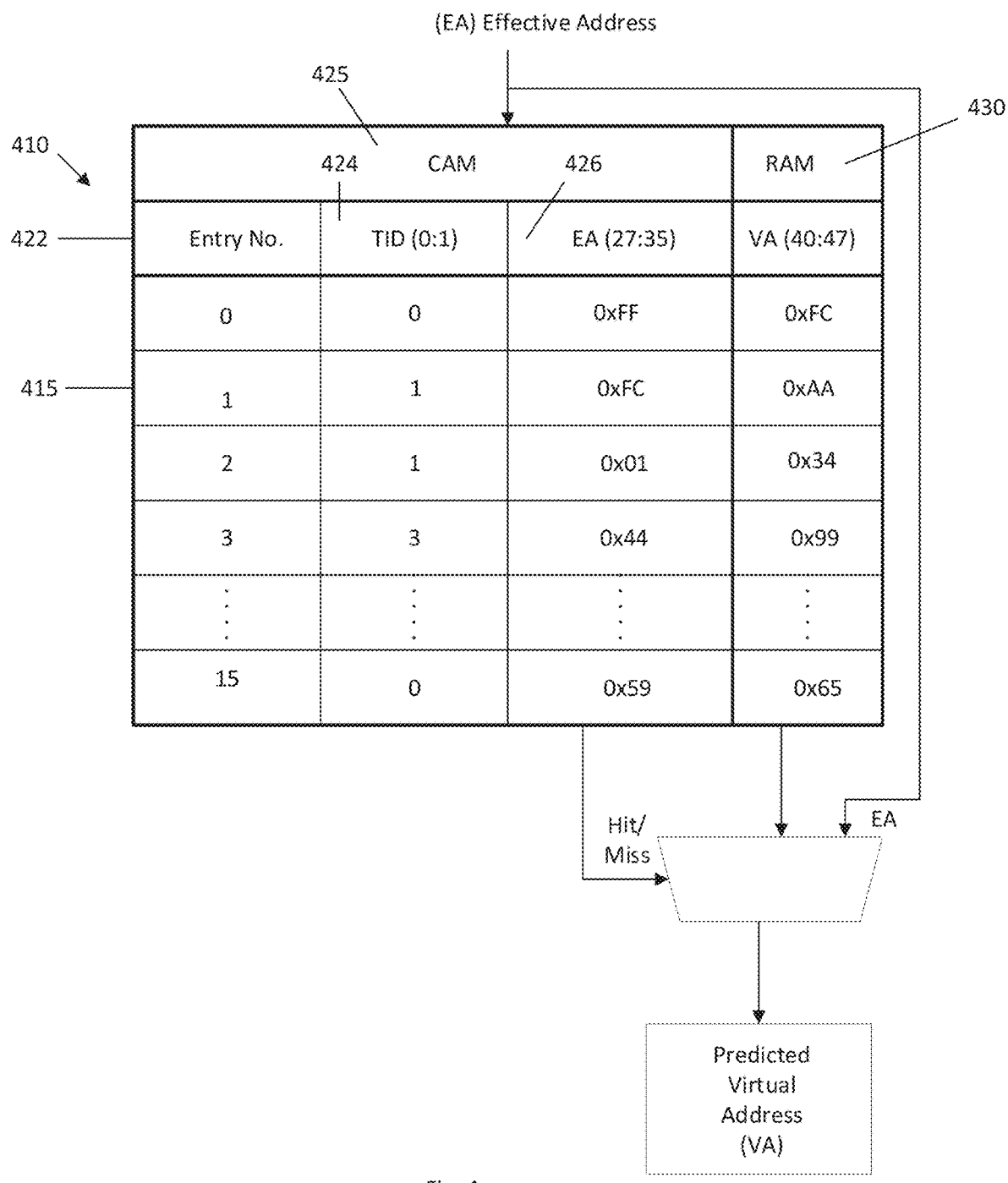
FIG. 4 depicts an example of a virtual address predictor.

FIG. 4 illustrates an embodiment of an address predictor 410, also referred to as an address prediction table, for predicting translations of effective addresses to virtual or intermediate addresses. More specifically, in one or more embodiments, address predictor 410 predicts the intermediate address, virtual address or output that would be generated by a SLB. Address predictor 410 is a cache of predictor entries 415 which hold and map a portion of the effective address bits to a virtual or intermediate address. The address predictor 410 is arranged as a table with entries 415 as shown in FIG. 4 where the table has a CAM portion 425 and a RAM portion 430. Each entry 415 in the predictor 410 includes an entry number 422, which is a number to identify the entries in the address prediction table 410, and a thread identification field 424 to identify the thread of each entry 415 in the predictor 410. Each entry 415 also includes a portion of the effective address bits, referred to as EA portion bits 426, which is mapped, in the RAM column, to the intermediate or virtual address corresponding to those EA portion bits 426. In other words, address predictor 410 has for each entry 415 a selected portion of the EA bit field which is mapped to a virtual (intermediate) address (VA) and/or a VA bit field. In the embodiment of FIG. 4, address predictor 410 contains sixteen entries but more or less entries are contemplated and will in part be a function of the size of the virtualized memory. The entries 415 in address predictor 410 are preferably not associated with any particular thread.

The bits of the effective address to select as the EA portion bits 426 for use in address predictor 410 can vary and will depend upon a number of design factors and the implementation. In an aspect, the address predictor 410 is organized as an EA-CAM, VA-RAM structure similar to the SLB, and the address predictor 410 is intended to act as a smaller cache of the SLB that can be accessed faster than the SLB. How accurate the address predictor 410 will be is a function of which EA portion bits 426 are selected for the address predictor 410.

A small portion of the virtual address bits are needed to determine the hash to index into the TLB array. Moreover, since segments in memory are quite large, e.g., 256M, program access patterns typically are relatively well localized within the boundary of a single segment of virtual address space. The large segment size and small amount of virtual (intermediate) address bits necessary to determine the hash for the TLB array provides an opportunity to predict the virtual (intermediate) address before the actual virtual (intermediate) address is known through a SLB look-up. Not the entire bit field of the effective address is used or selected for use in predicting the virtual address. Rather, only a small portion of the bit field of the effective address is required to provide a reasonably accurate virtual (intermediate) address prediction, and the EA portion bits 426 in one or more embodiments are selected from the higher order effective address bits, and preferably from the ESID or EPN portion of the effective address to provide reasonable prediction accuracy. The portion of bits from the ESID or EPN portion of the effective address to use for the address predictor 410, e.g., for EA portion bits 426, will depend upon the implementation used. In an embodiment, effective address bits (27:35) are selected as the EA portion bits 426 in predictor 410, although other bits of the EPN portion of the effective address are contemplated. In the examples and embodiments described and explained herein, the effective address uses 64 bits for explanation and not as a limitation on the illustrative embodiments. One or more embodiments can be practiced with an addressing system of any size.

The entries 415 in address predictor 410 are based upon recent history of demanded accesses to the SLB entries. When the system first starts, the entries 415 in address predictor 410 are populated by the most recent accesses to the SLB entries, and in an embodiment where address predictor 410 has sixteen (16) entries 415, the address predictor 410 would initially be populated by the first sixteen (16) accesses to the SBL entries. The actual mapping included in the address predictor 410 can vary, and in an embodiment, the mapping in the predictor 410 created and/or taken from the SLB and/or segment table will include the virtual (intermediate) address (VA) (or selected bits from the virtual/intermediate address (VA)), and the EA portion bits 206 corresponding to and mapped to that virtual/intermediate address (VA). When the address predictor 410 overflows, when the program moves onto a different data set, and/or when the address predictor mispredicts, then the entries 415 in the address predictor 410 can be replaced. The criteria for replacing entries 415 can vary depending upon the implementation and design criteria. In an embodiment, the selection of which entry 415 to replace in the address predictor 410 is decided by a binary tree least recently used (LRU) algorithm. In an aspect, the LRU is updated each time there is a hit on the address predictor 410, e.g., each time the address predictor 410 successfully predicts the virtual/intermediate address, and the LRU is also updated each time a new entry 415 is written into the address predictor 410. Other criteria and techniques for determining and/or selecting the entries 415 for the address predictor 410 are contemplated.

In operation, an effective address will need translation to access physical/real memory in a system. The effective address as shown in FIG. 4 is supplied or provided to address predictor 410. The address predictor 410 is checked, e.g., a comparison is performed, to determine if the corresponding portion, e.g., bit field, of the effective address supplied to the predictor 410 matches with any of the EA portion bits 426 stored in any of the entries 415 of the address predictor 410.

In one or more embodiments, if there is a matching entry 415 in the address predictor 410, the matching entry 415 is checked, e.g. a comparison is performed, to determine whether the thread identification 424 in the matching prediction table entry 415 matches the thread of the memory access corresponding to the effective address supplied to the address predictor 410. If there is a matching entry 415, e.g., matching EA portion bits 426 and a matching thread ID 424 in the address predictor 410, then the address predictor 410 hits and will provide the virtual/intermediate address in the RAM portion 430 of the hitting entry 415 as the predicted virtual/intermediate address. To differentiate the predicted intermediate (virtual) address obtained from the address predictor 410 from the actual intermediate (virtual) address returned from a SLB look-up, the terms "predicted virtual address", "predicted VA", "predicted intermediate address" will be used to differentiate from the "actual virtual address", "virtual address", "actual VA", "VA", "actual intermediate address", and/or "intermediate address" obtained from the SLB look-up.

Figure 5:
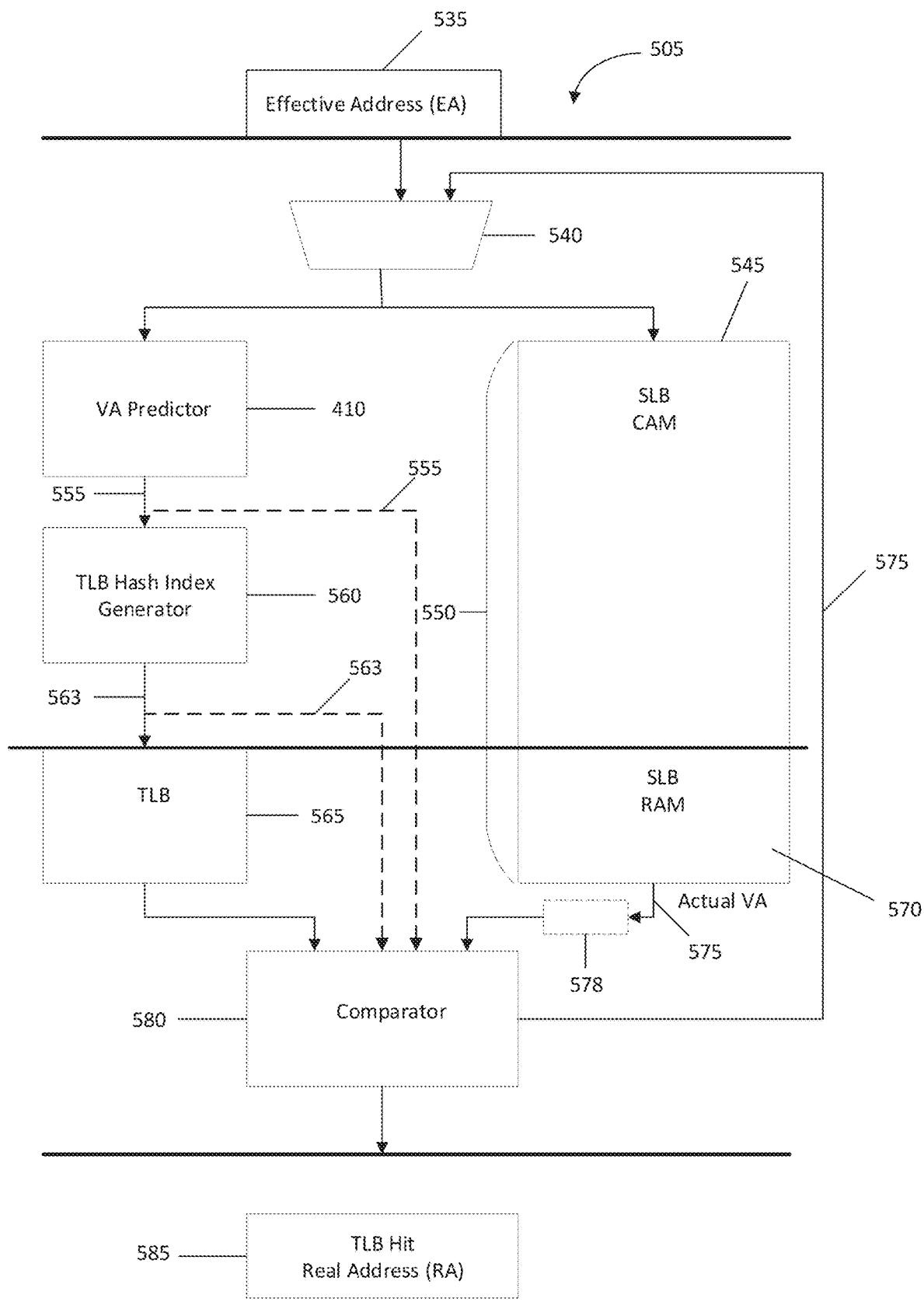
FIG. 5 depicts a block diagram of an effective address to real address prediction using an embodiment of a virtual address predictor.

FIG. 5 illustrates a block diagram of an address prediction system using in an embodiment the address predictor 410 of FIG. 4 for predicting a virtual/intermediate address from an effective address. As shown in FIG. 5, an effective address (EA) 535 is supplied to address translation system 505. In an aspect, the effective address (EA) 535 is supplied to a multiplexor 540. The effective address is thereafter sent to both the address predictor 410, and to the SLB to perform an SLB look-up. The address predictor 410 if it hits, supplies a predicted virtual/intermediate address (VA) 555 to the TLB hash index generator 560. The TLB hash index 560 generates a hash using the predicted virtual/intermediate address 555 and supplies the hash 563 to the TLB 565. Meanwhile, the effective address supplied to the SLB undergoes the SLB look-up process, and more specifically undergoes the CAM portion 545 of the SLB 550 look-up process. The processing of the effective address in the address predictor 410 to generate the predicted virtual/intermediate address 555, and generating the hash 563 from the predicted virtual/intermediate address in the TLB hash index generator 560 are all preferably performed in a single cycle of the processor, and preferably simultaneously with processing the CAM portion of the SLB look-up.

In address translation system 505, the hash 563 of the predicted virtual/intermediate address is provided to TLB 565 to generate a real address (RA), while the SLB look-up continues, including specifically performing the RAM portion of the SLB look-up, to generate the actual virtual/intermediate address 575. A TLB look-up is performed in the TLB 565 to generate a translation of the predicted virtual (intermediate) address (and/or translation of the hash of the predicted virtual/intermediate address) to a real address (RA). In one or more embodiments, the predicted virtual/intermediate address 555 is compared in comparator 580 to the actual virtual/intermediate address 575 generated by SLB 550. In one or more embodiments, in response to the actual virtual/intermediate address 575 being available from SLB 550, the TLB hash is generated by hash generator 578 with the actual virtual/intermediate address 575 and is compared in comparator 580 to the hash 563 of the predicted virtual/intermediate address 555 supplied from the TLB hash index generator 560. If the predicted virtual/intermediate address 555 and/or hash of the predicted virtual/intermediate address 563 is the same as the actual virtual/intermediate address 575 or the hash of the actual virtual/intermediate address, then the real address (RA) 585 provided by the TLB using the predicted virtual/intermediate address should be accurate (the TLB should be a hit), and the effective address has been translated into a real address. In one or more embodiments, the TLB look-up, the RAM portion of the SLB look-up, and the comparison between the predicted virtual/intermediate address and the actual virtual/intermediate address preferably all occur during a single cycle in the system 505, and the process of translating an effective address to a real address using the predicted virtual/intermediate address takes two cycles, and/or is at least faster than performing a full SLB look-up.

If on the other hand, the predicted/intermediate virtual address (or hash of the predicted virtual/intermediate address) does not match the actual virtual/intermediate address (or hash of the actual virtual/intermediate address), then in an embodiment the TLB 565 cancels the translation using the predicted virtual/intermediate address, and the translation is retried using the actual virtual/intermediate address 575 generated from translating the effective address (EA) 535 in SLB 550. As shown in FIG. 5, if the predicted virtual (intermediate) address 555 does not match the actual virtual (intermediate) address 575, the actual virtual (intermediate) address 575 is resubmitted to the multiplexor 540 and the actual virtual (intermediate) address 575 (and/or hash of the actual virtual (intermediate) address) is submitted to the TLB 565 for look-up.

In addition, if an entry 415 does not exists in address predictor 410 for the effective address (EA) 535 being translated and submitted to the address predictor 410, then a prediction of EA=VA will be used to access the TLB 565. In this scenario, where the effective address is used as the predicted virtual (intermediate) address, it is likely that the predicted virtual (intermediate) address will not match the actual virtual (intermediate) address, and the actual virtual (intermediate) address 575 from the SLB 550 will be relaunched to the system 505 to perform a TLB look-up using the actual virtual (intermediate) address 575.

Figure 6:
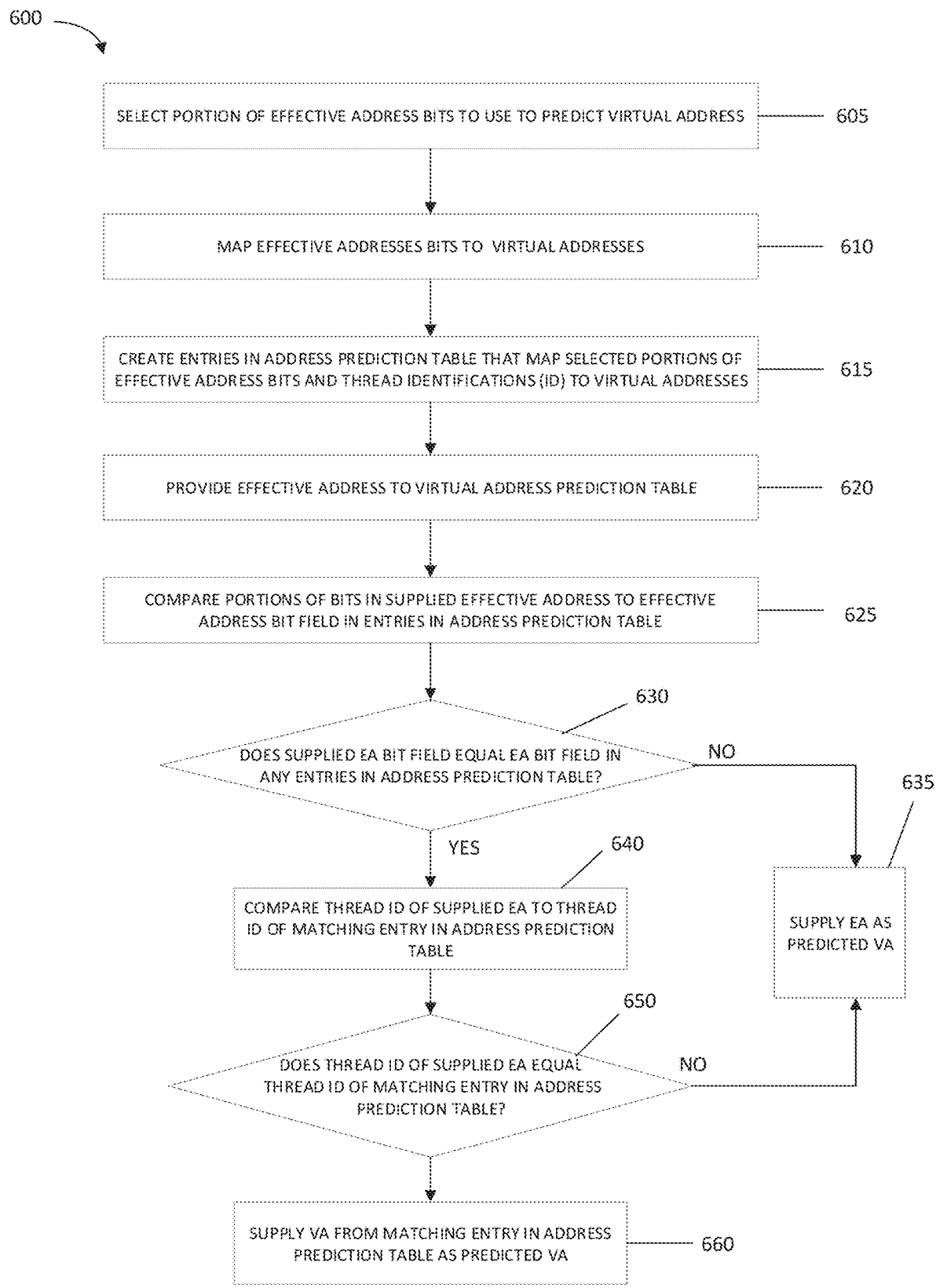
FIG. 6 is an exemplary flowchart illustrating and describing a method of predicting a virtual address translation from an effective address according to an embodiment of the present disclosure.
Figure 7:
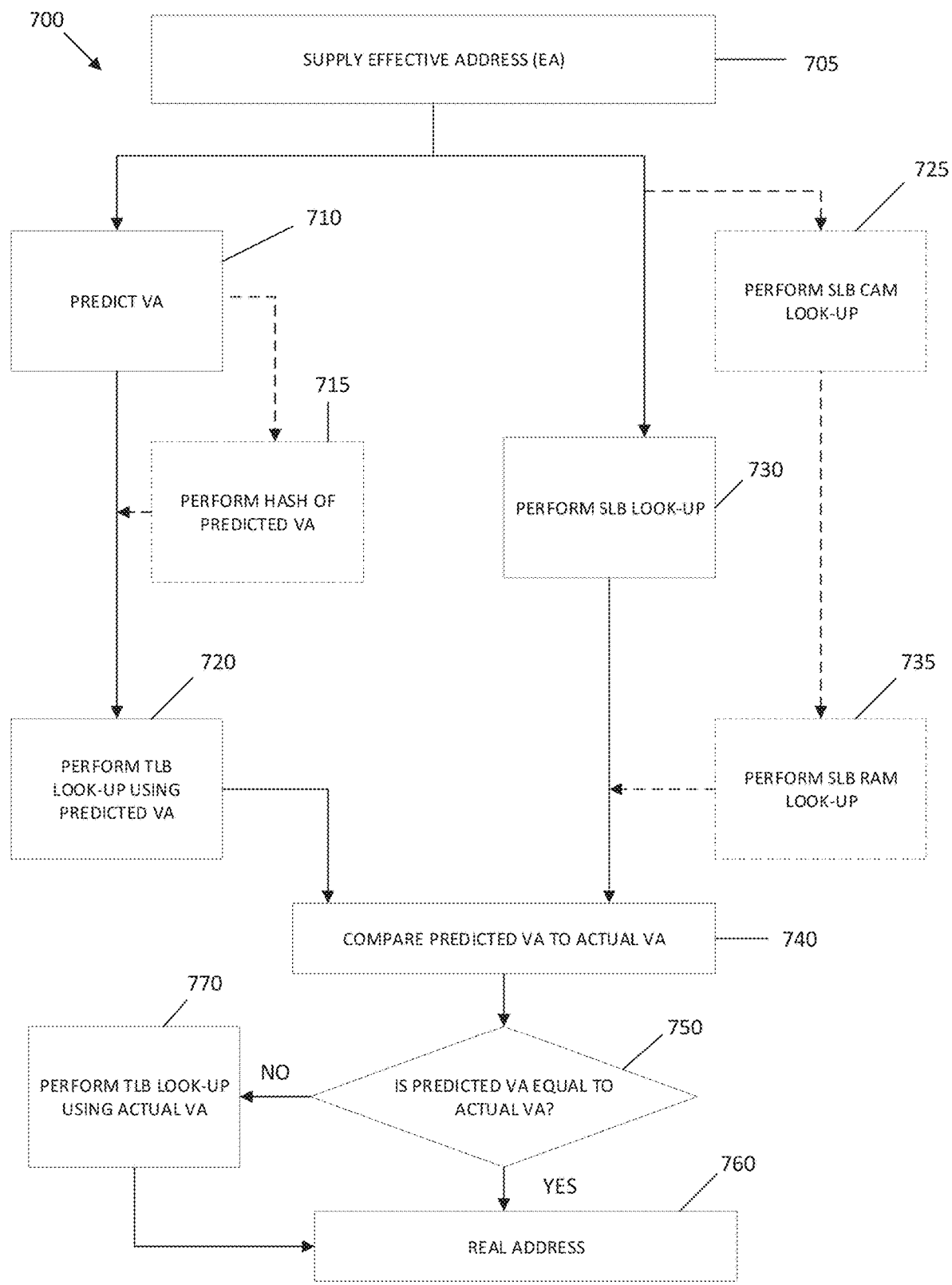
FIG. 7 is an exemplary flowchart illustrating and describing a method of performing effective address to real address translation according to an embodiment of the present disclosure.

FIG. 6 is an exemplary flowchart in accordance with one or more embodiments illustrating and describing a method of predicting an address translation, more specifically an example of a method of predicting the translation of an effective address into an intermediate or virtual address. FIG. 7 is an exemplary flowchart in accordance with one or more embodiments illustrating and describing a method of translating effective addresses to real addresses, and more specifically an example of a method of using a predicted virtual (intermediate) address to translate an effective address to a real address. While the methods 600 and 700 are described for the sake of convenience and not with an intent of limiting the disclosure as comprising a series and/or a number of steps, it is to be understood that the processes do not need to be performed as a series of steps and/or the steps do not need to be performed in the order shown and described with respect to FIGS. 6 and 7, but the processes may be integrated and/or one or more steps may be performed together, simultaneously, or the steps may be performed in the order disclosed or in an alternate order.

An embodiment of method 600 of generating a virtual (intermediate) address prediction from an effective address (EA) is illustrated in FIG. 6. The method of FIG. 6 includes in an aspect, a method of creating an address predictor or address prediction table, and in a further aspect a method of using the address predictor to predict or generate a virtual or intermediate address translation from an effective address. In method 600, a portion of the effective address (EA) bits are selected in 605 for use in predicting the virtual/intermediate address (VA). In one or more embodiments, higher order bits of the effective address bit field corresponding to the ESID or EPN portion of the effective address, or portions thereof, are selected as the EA portion bits, e.g., EA portion bits 426, from the effective address for use in predicting the virtual/intermediate address. In other words, not the entire bit field of the effective address is used or selected for use in predicting the virtual/intermediate address. The portion of the bit field of the effective address, e.g., EA portion bits 426, is selected to provide reasonable prediction accuracy, and in an embodiment is selected to derive all or at least a significant portion of the virtual/intermediate address bits necessary to build the TLB index hash. In one or more embodiments, the higher order bits 206, e.g., the ESID or EPN portion, of the effective address bit field 204, or portions thereof, are selected as the portion (e.g., bit field) used for predicting the virtual/intermediate address. In an embodiment, effective address bits (27:35) are selected in a 64 bit address architecture, although other bit fields from the effective address are contemplated.

In method 600, one or more effective addresses (EAs) at 610 are mapped to virtual or intermediate addresses (VAs). In an embodiment, the mappings can be created in a segment table and/or SLB. The process 600 continues at 615 where entries are created in an address predictor, e.g., address predictor 410 from FIG. 4. In one or more embodiments, entries are created in the address table predictor mapping CAM portions of the SLB to RAM portions of the SLB. In one more aspects, effective addresses, and in an embodiment, the selected portion of an effective address, is mapped to corresponding virtual/intermediate addresses, and in an embodiment, to selected portions of the virtual/intermeidate address. In one or more embodiments, thread identification information is also mapped in the address predictor.

Steps 605, 610, and 615 are utilized to create an address predictor, also referred to as an address prediction table, and in one more embodiments, a virtual (or intermediate) address predictor or virtual (or intermediate) address prediction table. It will be appreciated that the thread identification is optional, and additionally or alternatively that more data may be entered into the address predictor. It will also be appreciated that upon initialization the address prediction table and/or intermediate address table cache may be empty and that the address predictor will be filled with the most recent accesses to the SLB, e.g., will be filled with truncated effective address mappings from the SLB.

The method 600 also includes a method of predicting a virtual or intermediate address, and in an aspect, a method of using an address predictor, for example, address predictor 410 and/or an address predictor created by steps 605, 610, and 615. At 620, an effective address to be translated is provided to an address predictor table, e.g., predictor 410 and/or address predictor table created through blocks 605, 610, and 615. In one or more embodiments, the effective address is to be translated to a virtual or intermediate address, and more specifically in an aspect to a predicted virtual or intermediate address.

Portions of the bits in the effective address provided for translation that correspond to the selected portions of the effective addresses used in creating the address predictor are compared at 625 to the effective address bit field in the entries in the address predictor, e.g., entries in the address predictor table. That is, a portion of the bit field of the effective address to be translated is compared to entries in the address predictor table to see if the effective address bit field portions match. If at 630, there is no match between the entries in the address predictor table and the effective address provided for comparison to the address prediction table, i.e., (630:No), then method 600 proceeds to step 635 where the effective address is supplied as the predicted virtual or intermediate address. In other words, when there are no matching effective address portions in the address prediction table, i.e., the address predictor table misses, in one or more embodiment the effective address is returned as the predicted virtual or intermediate address.

At 630, if there is a match between the effective address provided to the address predictor table and an effective address in an entry in the address predictor table (630:Yes), then the process continues to 640. That is, if the portion of the bit field of the effective address provided to the address predictor table that corresponds to the effective address bit field used to create the address predictor table matches any of the entries in the address predictor table the process continues to 640.

At 640, the thread identification (ID) of the effective address provided to the address prediction table is compared to the thread identifications (IDs) of the entries in the address predictor table, and more specifically to the entry in the address prediction table that had the matching effective address portions from step 630. It can be appreciated that thread identification comparison, i.e., step 640, is optional, and further in an aspect the comparison performed at 640 could be performed before the comparison and determination steps 625 and 630 in method 600.

The method 600 continues to step 650 where it is determined whether the thread ID in the entries in the address predictor table matches or equals the thread ID of the effective address provided for translation, and in an embodiment, it is determined whether the thread ID of the matched entry in the address predictor table from steps 625 and 630 matches or equals the thread ID of the effective address provided to the address predictor table for translation. If at 650 there is a match between the address predictor table entry and the supplied effective address (650:Yes), then the process continues to 660 where the virtual/intermediate address from the matching address predictor table entry is provided as the predicted virtual/intermediate address. If at 650 there is not a match (650: No), then the process proceeds to 635 where the EA is provided as the predicted virtual/intermediate address.

FIG. 7 illustrates a flow chart of an embodiment of a method 700 of translating an address in memory, including in an aspect translating an effective address into a real address. In one or more embodiments, a method of translating an effective address to a real address is disclosed that utilized a virtual or intermediate address predictor.

In method 700 of translating an address, at 705, as shown in FIG. 7, an effective address (EA) for translation to a real address is provided or supplied. In one or more embodiments, the effective address at 710 is supplied to virtual address predictor, which predicts the virtual or intermediate address from a portion of the effective address bit field, preferably the higher order bits in the effective address bit field. In one or more embodiments, the virtual or intermediate address is predicted from the EPN or ESID portion of the effective address bit field, and more preferably some portion of the EPN or ESID bit field. In an example, the virtual or intermediate address is predicted from the effective address bits (27:35). The virtual or intermediate address in one or more embodiments may be predicted using the address predictor of FIG. 4 and/or FIG. 5.

The method 700 continues in an embodiment at 715 where a hash is performed on the predicted virtual or intermediate address. In one or more embodiments, the virtual or intermediate address is predicted at 710 and in an aspect the hash is performed on the predicted virtual/ intermediate address at 715 in a single cycle of the processor/system. At 720, TLB look-up is performed using the predicted virtual/intermediate address or the hashed predicted virtual or intermediate address. If performing the TLB look-up with the predicted virtual/intermediate address hits, then a real address is provided or generated.

The effective address supplied for translation at 705 is also sent to the SLB to perform a SLB look-up at 730. The effective address is sent to the SLB preferably at the same time as the effective address is sent to predict the virtual or intermediate address. The processing of the effective address in the SLB where the SLB performs an SLB look-up to translate the effective address into a virtual or intermediate address in one or more embodiments comprises preforming at 725 SLB CAM look-up and at 735 performing a SLB RAM look-up. The SLB CAM look-up at 725 generally occurs in a first cycle of the processor system. The SLB RAM look-up at 735 generally is performed in the cycle after the SLB CAM look-up. The process blocks 725, 730, and 735 translate an effective address into the actual virtual or intermediate address.

At 740 the predicted virtual/intermediate address is compared to the actual virtual/intermediate address. In one or more embodiments, the virtual/intermediate address predicted at 710 is compared to the actual virtual/intermediate address retrieved from the SLB look-up from 730/735, and at 750 if the predicted virtual/predicted address is the same as (equal to) the actual virtual/intermediate address, (750: Yes), then at 760 the real address provided from the TLB look-up at 720 using the predicted virtual/intermediate address is accurate. It should be appreciated that the comparison at 740 and determination at 750 can be combined into one step. It should also be appreciated that checking if the predicted virtual/intermediate address is the actual virtual/intermediate address can be performed in many ways and that the comparison at 740 and determination at 750 can also utilize the hash of the predicted virtual/intermediate address to compare with the hash of the results of the SLB look-up of 730/735. In other words, the result of the SLB look-up from 730/735 can optionally be hashed at optional step and the hash of the SLB look-up, i.e., the hash of the actual virtual/intermediate address, can be compared at 740 to the hash of the predicted virtual/intermediate address from 715 and the determination at 750 performed between the hashed values.

If at 750 it is determined that the predicted virtual/intermediate address (or hash of predicted virtual/intermediate address) is not the same as the actual virtual/intermediate address (or hash of the actual virtual/intermediate address) (750:No), then at 770 the actual virtual/intermediate address (or hash of the actual virtual/intermediate address) from the SLB look-up can be used for the TLB look-up at 720. Depending upon the design, the data taken from the SLB look-up at 730/735, and the data used in the comparison at 740 and the determination at 750, the actual virtual/intermediate address can be used at 710 and/or 715 to perform a hashing procedure on the actual virtual/intermediate address.

While the illustrative embodiments described above are preferably implemented in hardware, such as in units and circuitry of a processor, various aspects of the illustrative embodiments and/or techniques may be implemented in software as well. For example, it will be understood that each block of the flowchart illustrations in FIGS. 6 and 7, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of translating a virtualized address to a real address comprising, by a processing system:
receiving a virtualized address for translation;
generating a predicted intermediate address translation using a portion of the bit field of the virtualized address;
determining a predicted real address using the predicted intermediate address or portion thereof;
performing a translation of the virtualized address to an actual intermediate address;
determining whether the predicted intermediate address is the same as the actual intermediate address; and
in response to the predicted intermediate address being the same as the actual intermediate address, providing the predicted real address as the real address.

2. The method of claim 1, further comprising in response to the predicted intermediate address not being the same as the actual intermediate address determining the real address using the actual intermediate address.

3. The method of claim 1, further comprising:
performing a hash of the predicted intermediate address or portion thereof and performing a translation of the virtualized address using the hash of the predicted intermediate address or portion thereof;
performing a hash of the actual intermediate address or portion thereof; and
determining whether the hash of the predicted intermediate address or portion thereof is the same as the hash of the actual intermediate address or portion thereof.

4. The method of claim 1, wherein performing a translation of the virtualized address to the actual intermediate address comprises looking up the actual intermediate address from a segment look-aside buffer (SLB), and determining the predicted real address using the predicted intermediate address or portion thereof comprises looking up the predicted real address from a translation look-aside buffer (TLB).

5. The method of claim 1, wherein generating a predicted intermediate address translation is performed in a first cycle of a processor, determining a predicted real address using the predicted intermediate address or portion thereof is performed in a second cycle of the processor, and performing a translation of the virtualized address to the actual intermediate address takes more than a single cycle of the processor.

6. The method of claim 1, wherein generating a predicted intermediate address translation using a portion of the bit field of the virtualized address comprises looking up the predicted intermediate address from a table cache of entries containing mappings of virtualized addresses or portions thereof to intermediate addresses or portions thereof.

7. The method of claim 6, wherein each entry in the table cache comprises portions of the bit field of the virtualized address mapped to an intermediate address or portions thereof and looking up the intermediate address from the table cache comprises comparing a portion of the bit field of the received virtualized address to the corresponding portion of the bit field of the virtualized address in the entries of the table cache.

8. The method of claim 6, wherein each entry in the table cache further comprises a thread identification corresponding to the virtualized address contained in that entry, and looking up an intermediate address from the table cache further comprises comparing a thread identification of the received virtualized address to the thread identification in the entries in the table cache.

9. The method of claim 6, further comprising, in response to the portion of the bit field of the received virtualized address matching the corresponding portion of the bit field of the virtualized address in at least one table cache entry, providing the mapped intermediate address or portion thereof of the matching table cache entry as the predicted intermediate address translation.

10. The method of claim 6, further comprising, in response to the portion of the bit field of the received virtualized address not matching the corresponding portion of the bit field of the virtualized address in any table cache entry, providing the bit field of the virtualized address or a portion thereof as the predicted intermediate address.

11. The method of claim 6, wherein the table cache is created using entries from a cache of virtualized address to actual intermediate address mappings.

12. The method of claim 11, wherein entries in the table cache are replaced using a least recently used (LRU) algorithm.

13. A computing system comprising:
a predictor table cache having a plurality of entries for translating a virtualized address to a predicted intermediate address or portion thereof, wherein each entry maps a portion of a bit field of the virtualized address to the predicted intermediate address or portion thereof;
an intermediate address table cache having a plurality of intermediate address entries, wherein each intermediate address entry maps the virtualized address or portion thereof to an actual intermediate address or portion thereof;
a real address table cache having a plurality of real address entries, wherein each real address entry maps an intermediate address or portion thereof to a real address; and
a processor;
wherein the system is configured to
receive a virtualized address for translation;
predict from a portion of the bit field of the virtualized address the predicted intermediate address or portion thereof using the predictor table cache;
determine the predicted real address using the predicted intermediate address or portion thereof from the predictor table cache in the real address table cache;
determine the actual intermediate address or portion thereof using the intermediate address table cache;
determine whether the predicted intermediate address or portion thereof is the same as the actual intermediate address or portion thereof; and
in response to the predicted intermediate address or portion thereof being the same as the actual intermediate address or portion thereof, provide the predicted real address as a real address.

14. The system of claim 13, wherein the system is further configured to determine, in response to the predicted intermediate address or portion thereof not being the same as the actual intermediate address or portion thereof, the real address using the actual intermediate address or portion thereof in the real address table cache.

15. The system of claim 13, wherein the system is further configured to:
perform a hash of the predicted intermediate address or portion thereof and perform a translation of the virtualized address using the hash of the predicted intermediate address or portion thereof;
perform a hash of the actual intermediate address or portion thereof; and
determine whether the hash of the predicted intermediate address or portion thereof is the same as the hash of the actual intermediate address or portion thereof.

16. The system of claim 13, wherein the system is further configured to look up the actual intermediate address or portion thereof from a segment look-aside buffer (SLB) and look up the predicted real address or portion thereof from a translation look-aside buffer (TLB).

17. The system of claim 13, wherein the system is configured to: predict the predicted intermediate address or portion thereof in a first cycle of the processor, determine the predicted real address using the predicted intermediate address or portion thereof in a second cycle of the processor, and determine the actual intermediate address or portion thereof using the intermediate table cache in more than a single cycle of the processor.

18. The system of claim 13, wherein the system is configured to predict the predicted intermediate address by performing a comparison of a portion of the bit field of the received virtualized address to the corresponding portion of the bit field of the virtualized address in the entries of the Predictor table cache.

19. A computing system comprising:
a table cache of a plurality of entries, wherein each entry maps a portion of a bit field of a virtualized address to a predicted intermediate address;
a processor; and
a non-transitory computer-readable storage medium comprising program instructions that when executed by the processor cause the processor to:
receive a virtualized address for translation;
generate a predicted intermediate address using a portion of the bit field of the virtualized address;
determine a predicted real address using the predicted intermediate address;
perform a translation of the virtualized address to an actual intermediate address;
determine whether the predicted intermediate address is the same as the actual intermediate address;
in response to the predicted intermediate address being the same as the actual intermediate address, provide the predicted real address as the real address; and
in response to the predicted intermediate address not being the same as the actual intermediate address, determine the real address using the actual intermediate address.

20. The system of claim 19, further comprising non-transitory computer-readable storage medium comprising program instructions that when executed by the processor cause the processor to:
perform a hash of the predicted intermediate address or portion thereof and perform a translation of the virtualized address using the hash of the predicted intermediate address or portion thereof;
perform a hash of the actual intermediate address or portion thereof; and
determine whether the hash of the predicted intermediate address or portion thereof is the same as the hash of the actual intermediate address or portion thereof.

* * * * *